Oct. 28, 1969   R. MAGNIER   3,474,876
POWER AND TRANSMISSION UNITS FOR AUTOMOTIVE VEHICLES OR THE LIKE
Filed Feb. 2, 1967   4 Sheets-Sheet 1

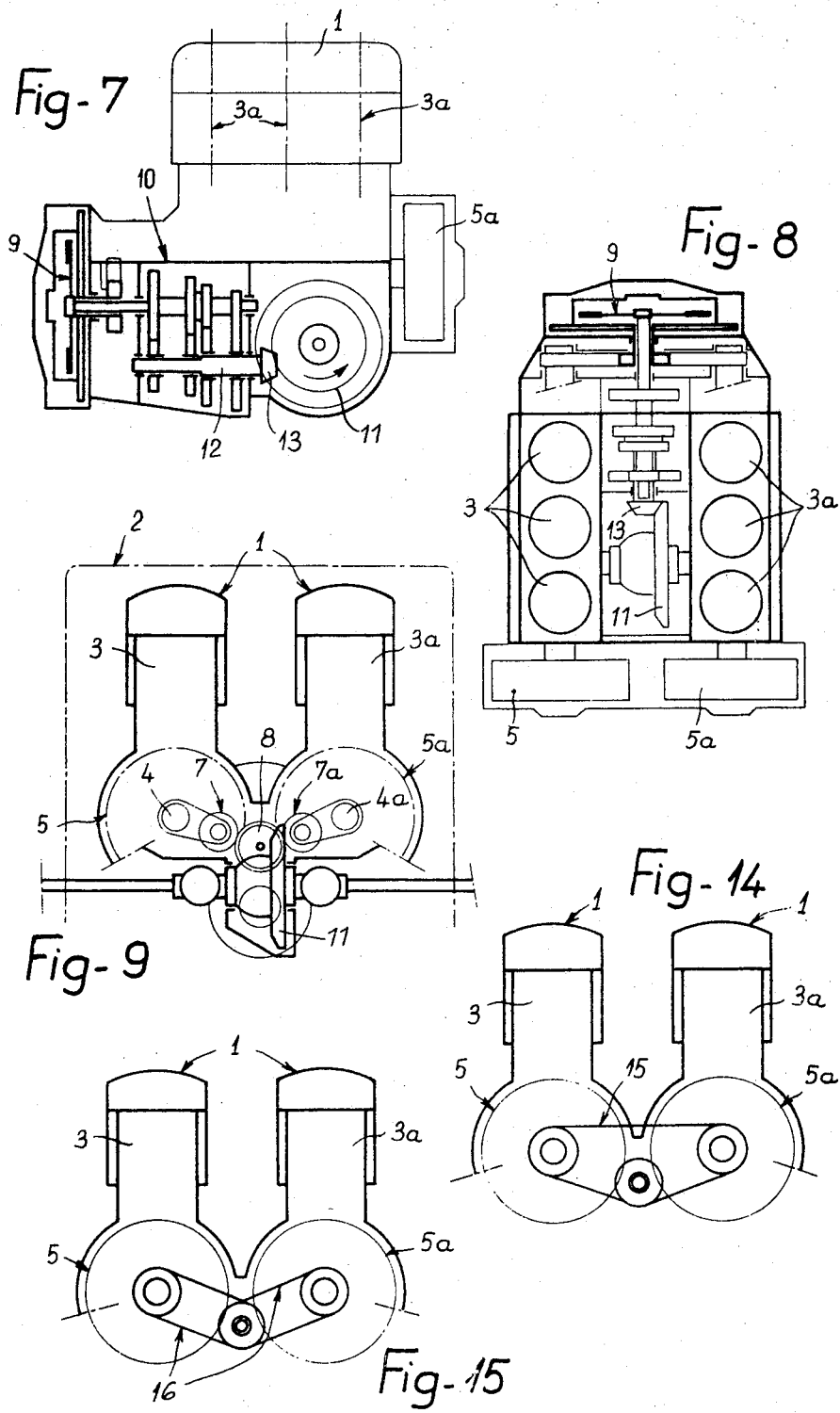

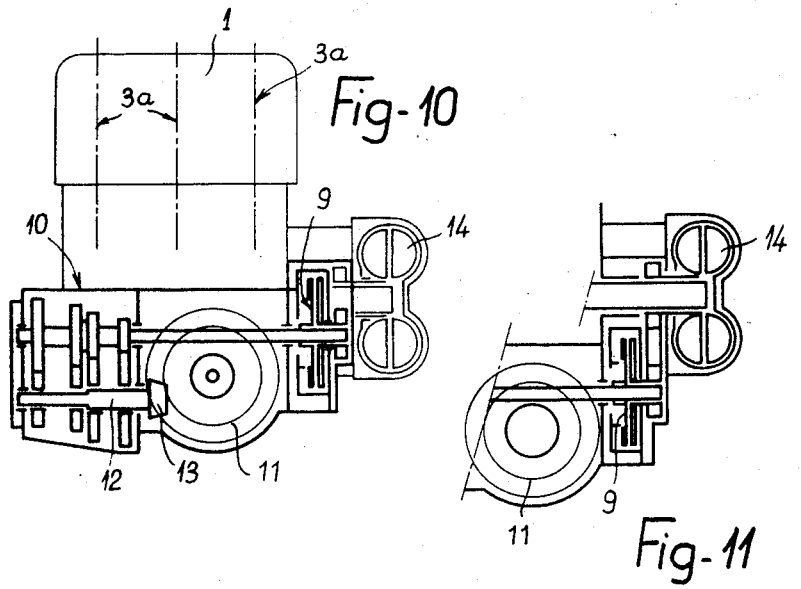
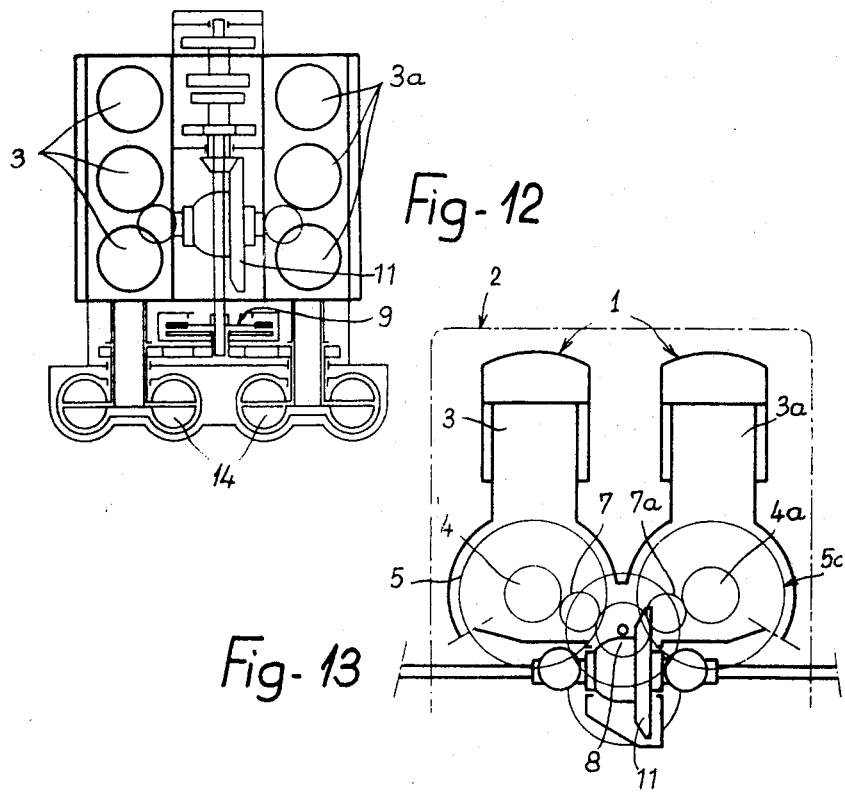

United States Patent Office 3,474,876
Patented Oct. 28, 1969

3,474,876
POWER AND TRANSMISSION UNITS FOR AUTOMOTIVE VEHICLES OR THE LIKE
Roger Magnier, Billancourt, France, assignor to Regie Nationale des Usines Renault, Billancourt, Hauts-de-Seine, France
Filed Feb. 2, 1967, Ser. No. 613,519
Claims priority, application France, Feb. 9, 1966, 49,005
Int. Cl. B60k 9/00; F02b 75/18
U.S. Cl. 180—54
3 Claims

ABSTRACT OF THE DISCLOSURE

Power and transmission unit intended for automotive vehicles or the like, and disposed longitudinally or transversely on the vehicle, characterized in that the engine comprises two cylinder lines and two crankshafts between which the transmission is mounted, the transmission, including a gear-box and differential, extending axially of the crankshafts.

---

This invention relates to a power and transmission unit of the type utilized on automotive vehicles or the like, wherein the engine can be disposed parallel to, or across the longitudinal center line of the vehicle.

As already known, in a unit of this character the main shafts of the transmission or change-speed mechanism, for example, which are generally parallel to the engine crankshaft axis, are offset laterally to reduce the vertical over-all dimension of the assembly. As a result, a state of unbalance is introduced into the elementary volumes and weights distribution of the vehicle, whether laterally or longitudinally.

Moreover, up to now no successful attempts have been made with a view to appreciably reduce the longitudinal dimension of the power unit, as this dimension is mainly subordinate to the length of the cylinder-block.

With the present invention a power and transmission unit can be designed which affords a satisfactory centering of the weights and volumes from the duel point of view of road-holding properties and the vehicle appearance.

Moreover, this invention permits constructing a considerably more compact vehicle, for a same power output, in comparison with known units, the longitudinal dimensions being reduced substantially by one-half.

The power and transmission unit according to this invention is characterised essentially in that the engine comprises two cylinder lines, two crankshafts and a transmission mechanism disposed between said crankshafts.

The crankshafts are preferably parallel and the cylinder lines may be either parallel or of the V-type. Moreover, each crankshaft comprises preferably its own flywheel.

The vertical projection on a plane of the differential and gear-change mechanism is coincident with the longitudinal center line of the engine cylinder-block, and the axial dimension of the complete assembly does not exceed the over-all dimensions of the engine proper. The gear case of the transmission mechanism benefits of the considerable rigidity of the engine crankcase.

The differential may be disposed either at the front or at the rear of the unit; alternately it may be disposed at the center, with the engine disposed either longitudinally of, or across the vehicle.

In order to afford a clearer understanding of this invention and of the manner in which the same may be carried out in practice, reference will now be made to the accompanying drawings illustrating diagrammatically by way of example a few typical forms of embodiments thereof. In the drawings:

FIGURES 7, 8 and 9 are views similar to FIGURES 4 to 6 but wherein the differential is offset at the rear of the unit, the engine-to-gearbox transmission being likewise of the gear type;

FIGURES 10, 12 and 13 are corresponding views illustrating a longitudinally disposed engine constituting a modification of the preceding forms of embodiment but utilizing a hydraulic transmission with mechanical clutch and bevel gears;

FIGURE 11 is a detail view of the same hydraulic transmission with mechanical clutch, and FIGURES 14 and 15 illustrate a flexible engine-to-gearbox transmission utilizing a single or double endless belt, chain or the like.

Figure 1:
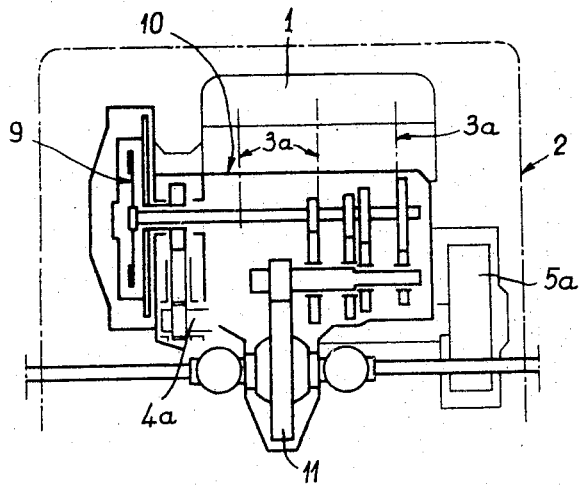
FIGURES 1, 2 and 3 are respectively a front elevational view, a plan view from above and a side elevational view of a transverse-mounted power and transmission unit according to this invention wherein the differential is centered beneath the engine unit, the engine-to-gearbox transmission being of the gear type.
Figure 2:
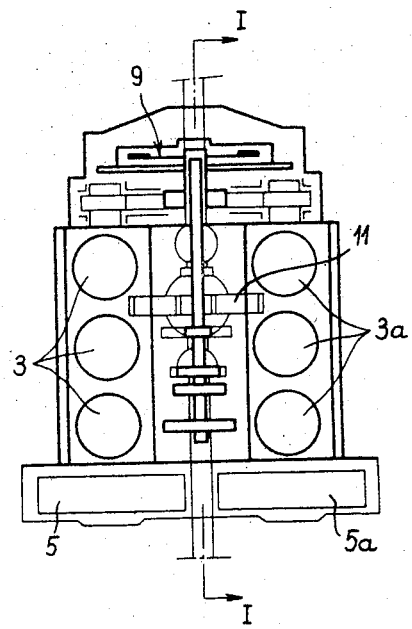
Figure 3:
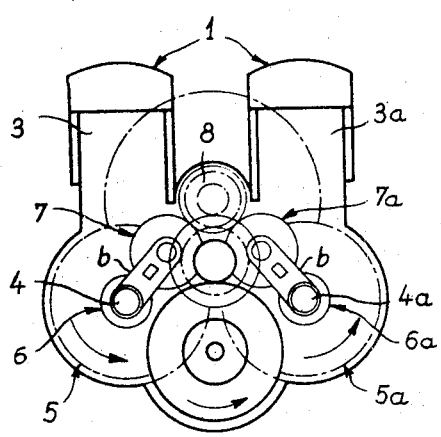
Figure 4:
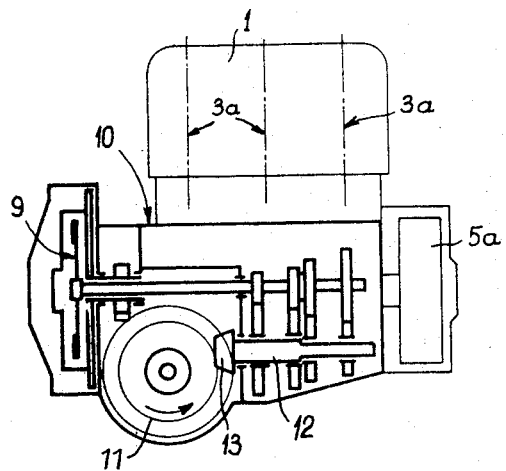
FIGURES 4, 5 and 6 are respectively a side elevational view, a plan view from above and a front elevational view of a longitudinally disposed engine unit having its differential offset forwardly of the unit, the engine-to-gearbox transmission being also of the gear type.
Figure 5:
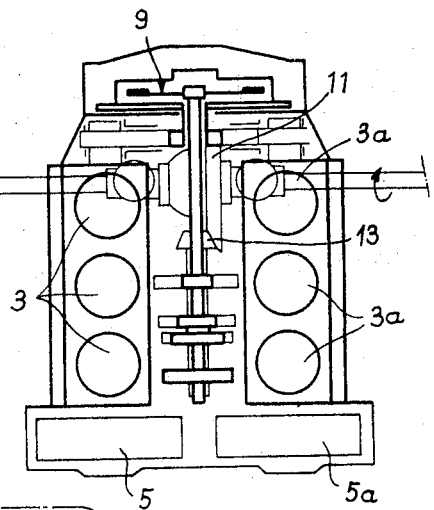
Figure 6:
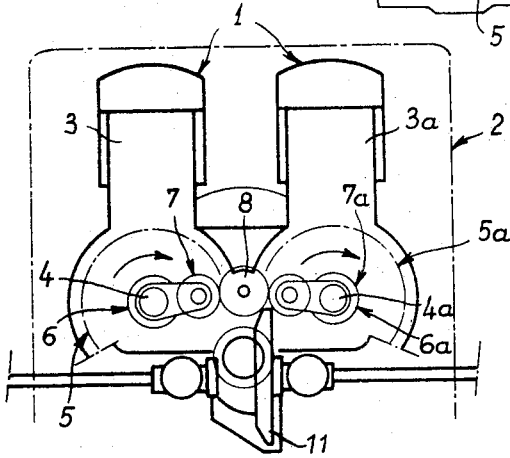

Referring first to FIGURES 1 to 3 of the drawings, it will be seen that the engine 1 of the unit according to this invention is transverse-mounted in the vehicle 2 and comprises cylinders 3 and 3a disposed either vertically or according to the V-type engine design, so as to constitute two cylinder lines parallel to the axes of the two crankshafts 4 and 4a.

The movement of rotation of these two crankshafts, which is equalized by means of a pair of flywheels 5 and 5a mounted on the crankshaft ends, is transmitted through gears 6, 7, 6a, 7a and 8, and a clutch 9, to a change-speed mechanism 10 of the manual or automatic control type, the transmission and clutch mechanism being mounted between the two cylinder lines.

This change-speed mechanism drives centrally of the cylinder block a differential 11 equally spaced from the axes of the two crankshafts 4 and 4a, and mounted under these crankshafts.

It will be noted that the gear transmission has to be equipped with vibration-absorbing means in order to reduce the angular oscillation of gears 6, 7, 6a, 7a and 8. To this end, elastic means may be associated with these gears, or an intermediate gear 7 or 7a may be resiliently mounted on an arm b oscillating with a moderate amplitude about the axis of crankshaft 4 or 4a.

In alternate forms of embodiment illustrated in FIGURES 4 to 14 of the drawings the engine 1 of the power and transmission unit of this invention is disposed longitudinally, the change-speed mechanism 10 comprising an output shaft 12 equipped with a bevel pinion 13. The differential 11 is disposed either at the front end (FIGURES 4 and 5) or at the rear end (FIGURES 7 and 8), of intermediate the ends (FIGURES 10 and 12), of the power unit.

Moreover, the coupling 14 between the engine and the change-speed transmission may be of the hydraulic type (FIGURES 10, 11 and 12), the engine being drivingly disengaged from the transmission by means of a clutch 9 of mechanical or similar type.

Finally, the power and transmission unit according to this invention may be provided with a flexible drive for example of the endless belt or chain type. FIGURE 14 shows a single-element 15 and FIGURE 15 a double-element 16 transmission of this character.

The power and transmission unit according to this invention appears to be particularly advantageous for relatively powerful vehicles in which a six- or eight-cylindered engine would have excessive over-all dimensions.

This arrangement is particularly beneficial in that it provides a compact, balanced assembly as far as its general structure is concerned, without requiring an increment of the drive-wheel track or an offsetting of the center of gravity of the mechanism with respect to the longitudinal axis of the vehicle.

Moreover, this disposal is particularly suitable for vehicles comprising a plurality of drive axles, due to the centering of the transmission.

Of course, the specific forms of embodiment described hereinabove with reference to the accompanying drawings should not be construed as limiting the scope of the invention since many constructional details may be modified therein without departing from the basic principles of the invention.

I claim:

1. A power and transmission unit for automotive vehicles and the like comprising two cylinder lines, two parallel crankshafts operatively connected to be rotatably driven in the same direction by said cylinder lines, a clutch and a transmission mechanism including a speed change gearbox, an engine to gearbox transmission and a differential distributing torque to road wheel shafts, said transmission being mounted between said two crankshafts in such a manner that the horizontal projection of the transmission, including the engine to gearbox transmission, speed change gearbox, and the differential, lies within the limits of said crankshafts and that the horizontal projection of said speed change gearbox, lies in the area between the two cylinder lines, and said differential axis being disposed beneath the two crankshafts and coincident with the center line of the engine.

2. A power and transmission unit, according to claim 1, in which said engine-to-gearbox transmission comprises at least one endless flexible member coupling each said crankshaft to said clutch.

3. A power and transmission unit for automotive vehicles and the like, comprising two cylinder lines, two parallel crankshafts operatively connected to be rotatably driven in the same direction by said cylinder lines, a clutch and a transmission mechanism including a speed change gearbox, an engine to gearbox transmission and a differential distributing torque to road wheel shafts, said engine to gearbox transmission comprising a train of gears coupling each said crankshaft to said clutch, an intermediate gear of each said train engaging at one side with a gear rotating with said crankshaft and on the other side with a gear responsive to said clutch, said intermediate gear being mounted on an arm supporting at one end the rotation axle of said intermediate gear and pivoting at the other end on said crankshaft in a manner to allow an oscillation of small amplitude of said intermediate gear, and said transmission being mounted between said two crankshafts in such a manner that the horizontal projection of the said transmission, including the engine to gearbox transmission, speed change gearbox and the differential, lies within the limits of said crankshafts and that the horizontal projection of said speed change gearbox lies in the area between the two cylinder lines.

References Cited

UNITED STATES PATENTS

| 845,850 | 3/1907 | Carter. | |
|---|---|---|---|
| 1,947,045 | 2/1934 | Hoffman | 123—55 |
| 2,238,615 | 4/1941 | Wolf. | |
| 3,262,513 | 7/1966 | Henriksson et al. | |

FOREIGN PATENTS 312,515  5/1929  Great Britain.

LEO FRIAGLIA, Primary Examiner

MILTON L. SMITH, Assistant Examiner

U.S. Cl. X.R.

123—52